United States Patent [19]

Brown

[11] Patent Number: 4,721,632
[45] Date of Patent: Jan. 26, 1988

[54] METHOD OF IMPROVING THE CONDUCTIVITY AND LOWERING THE EMISSIVITY OF A DOPED TIN OXIDE FILM

[75] Inventor: Franklin I. Brown, Riverview, Mich.

[73] Assignee: Ford Motor Company, Dearborn, Mich.

[21] Appl. No.: 900,469

[22] Filed: Aug. 25, 1986

[51] Int. Cl.$^4$ .............................................. B05D 5/12
[52] U.S. Cl. .................................. 427/108; 427/109; 427/110; 427/165; 427/166; 427/168; 427/126.2; 427/126.3; 427/255; 427/255.2; 427/299
[58] Field of Search ...................... 427/110, 126.2, 168, 427/165, 309, 166, 299, 126.3, 108, 255, 164, 109, 255.2

[56] References Cited

U.S. PATENT DOCUMENTS

| | | | |
|---|---|---|---|
| 2,617,741 | 11/1952 | Lytle | 427/108 |
| 2,617,742 | 11/1952 | Olson | 427/168 |
| 2,617,745 | 11/1952 | Raymond et al. | 427/108 |
| 2,695,247 | 11/1954 | Junge | 427/110 |
| 4,410,563 | 10/1983 | Richter et al. | 427/108 |
| 4,547,400 | 10/1985 | Middleton et al. | 427/109 |
| 4,548,836 | 10/1985 | Middleton et al. | 427/109 |

Primary Examiner—Janyce A. Bell
Attorney, Agent, or Firm—William E. Johnson; Clifford L. Sadler

[57] ABSTRACT

This specification is directed to a method of improving the conductivity and lowering the emissivity of a doped tin oxide film on the surface of a soda lime silica glass sheet. The method includes the steps of heating the glass sheet to a temperature in a range from 1000° F. to 1250° F. Thereafter, a fluorine-containing compound is applied to a surface of the heated glass sheet to react therewith to form a film in which divalent oxygen atoms and hydroxyl ions on the surface of the glass sheet are replaced with monovalent fluorine atoms. In this manner, the surface of the glass sheet is brought closer to a state of electro-neutrality and the monovalent fluorine atoms form a more stable bond with soda and silica atoms of the surface of the glass sheet. Thereafter, a doped tin oxide film is applied to the film formed on the heated glass sheet to a thickness required to give the doped tin oxide film the desired conductivity and emissivity characteristics.

2 Claims, No Drawings

METHOD OF IMPROVING THE CONDUCTIVITY AND LOWERING THE EMISSIVITY OF A DOPED TIN OXIDE FILM

TECHNICAL FIELD

This application is directed to a method of improving the conductivity and lowering the emissivity of a doped tin oxide film. In particular, the application is directed to a method for improving the conductivity and lowering the emissivity of a doped tin oxide film which has been placed on the surface of a soda lime silica glass sheet. Such a process results in a tin oxide film which has a lower emittance value than when no treatment is applied thereto. Such a tin oxide coated glass sheet will, for example, be better in reflecting infrared rays back into a room than a film on a glass sheet which has not been treated in accordance with the method of my invention.

BACKGROUND AND PRIOR ART STATEMENT

This invention relates to a method of producing soda lime silica glass sheet products bearing a thin, functional, coating of tin oxide to promote reflectivity of infrared radiation. These coatings are also electrically conductive. Generally, when a skilled artisan is talking about the ability of a coating to reflect infrared radiation. he uses the term emissivity. The lower the value of emissivity, the better the tin oxide coating is in reflecting infrared radiation.

Glass having an infrared radiation reflective coating thereon has substantial value in the construction industry. Such a coating is useful in providing windows with enhanced insulating value because they reflect infrared radiation back into the interior of the building in which they are located. Infrared radiation is a product of the fuel burned in the building. If the infrared radiation is allowed to escape through the window, more fuel will be required in order to keep the building at the same temperature. However, when windows having an infrared reflective coating thereon are employed, much of the infrared radiation is reflected back into the interior of the building. The lower the emissivity value of the coating on the windows, the more infrared radiation is reflected by the coating and returned to the interior of the building. Thus, a minor improvement in the emissivity of the coating is of major concern because such improvement means that the same coating will reflect more infrared radiation back into the interior of the building.

A search was conducted on the subject matter of this specification in the United States Patent and Trademark Office. The search resulted in the citation of the following U.S. Pat. Nos.: 2,566,346; 3,107,177; 3,677,814; 3,959,565; 4,146,657 and its reissue Re. 31,708; 4,235,945; 4,265,974 and 4,500,567. Each of these patents will be discussed individually below. None of the patents are felt to teach or suggest the method of my invention for the reasons set forth below.

U.S. Pat. No. 2,566,346 issued Sept. 4, 1951 for Electroconductive Products And Production Thereof. This patent teaches a method of providing a glass base with an electroconductive coating. The method is carried out by heating the base to a temperature above about 400° F. but below the temperature at which the glass becomes molten. Thereafter, an aqueous solution containing a tin compound and an ionizable fluoride is applied to the hot base. The patent does not disclose a pretreatment with a fluorine-containing compound as is taught in my method.

U S. Pat. No. 3,107,177 issued on Oct. 15. 1963 for a Method Of Applying an Electroconductive Tin Oxide Film And Composition Therefor. This patent teaches a method of producing a transparent electroconductive tin oxide film having a haze factor less than one percent. The tin oxide film is also capable of intimate electrical contact with a ceramic silver bus bar on a surface of a ceramic base. The method is carried out by heating the surface of a film to a film forming temperature and applying to the heated surface a composition having a pH between 4.5 and 7. The composition also contains an organic tin compound, HCl, and an ionizable fluorine-containing compound. The HCl concentration is up to four percent by weight based on the weight of ten. The surface of the ceramic base is heated to a film forming temperature above 400° F. at which the HCl component provides lower resistivity to the electroconductive film than said film forming composition consisting of the organic tin compound and an ionizable fluorine-containing compound as the essential ingredients. The method of this patent does not disclose a fluorine-containing compound be used for pretreating the surface of the ceramic material.

U.S. Pat. No. 3,677,814 issued on July 18, 1972 for a process For Forming Electroconductive Tin Oxide Films By Pyrolyzation Of Alkyl And Aryl Tin Fluorides. This patent teaches the formation of transparent electroconductive tin oxide films by pyrolysis of a tin organic compound which has a direct tin-fluoride bond. The patent does not disclose a pretreatment of the glass substrate with a fluorine-containing compound prior to the application of a tin oxide coating thereon.

U.S. Pat. No. 3,959,565 issued on May 25, 1977 for a Tin Oxide Coating. This patent disclosed a method of coating a sheet of glass with tin oxide by intermittent spraying of a mixture of materials in a non-aqueous solution and in an oxidizing atmosphere. The glass is maintained at a fixed temperature by supporting the glass in molten liquid at a controlled temperature. The spraying of the glass is conducted in successive passes involving small amount of spray per pass. The glass is moved continuously along a pool of the molten liquid during the spraying process. This patent does not teach the initial application of a fluorine-containing compound to the surface of the glass sheet prior to the application of the doped tin oxide film.

U.S. Pat. No. 4,146,657, subsequently reissued as Re. 31,708, issued on Mar. 27, 1979 for a Method Of Depositing Electrically Conductive Infra-red Reflective Transparent Coatings Of Stannic Oxide. This patent discloses electrically conductive films of tin oxide prepared by a process utilizing gaseous chemical compounds. These compounds react to form a tin-fluorine bond at a temperature which is (1) high enough so that the newly-created tin-fluorine bond-bearing molecule remains in the vapor phase, and (2) low enough so that oxidation of the molecule occurs only after the indicated rearrangement. Films prepared by the disclosed process are characterized by surface resistance as low as 1 ohm per square when the film thickness is as thin as about a micron. The patent does not disclose pretreatment of the glass with a fluorine-containing compound prior to the application of the doped tin oxide film.

U.S. Pat. No. 4,235,945 issued on Nov. 25, 1980 for High Resistivity Electroconductive Tin Oxide Films.

The patent discloses a method for pyrolytically forming electroconductive tin oxide films having higher resistivity for a given thickness than tin oxide films formed by known methods. The method is carried out by adding to the film-forming solution an organic compound which retards the rate of film formation reducing the particle size of the tin oxide film thus increasing the resistivity of the film. Small quantities of an organic compound such as cresol or benzyl alcohol are added to the film-forming solution. The patent does not teach the pretreatment of a glass sheet by a fluorine-containing compound prior to the application of a doped tin oxide film.

U.S. Pat. No. 4,265,974 issued on May 5, 1981 for an Electrically Conductive, Infrared Reflective, Transparent Coatings Of Stannic Oxide. This patent has a disclosure similar to the aforementioned U.S. Pat. No. 4,146,657 and no further discussion will be undertaken herein. It also has the same deficiencies as the aforementioned patent.

U.S. Pat. No. 4,500,567 issued on Feb. 19, 1985 for a Method For Forming Tin Oxide Coating. This patent teaches a method for forming a fluorine-containing tin oxide coating on the surface of a substrate. The substrate is contacted after being heated with a vapor of monobutyltin trichloride or a mixed vapor of monobutyltin trichloride and a doping agent composed of a fluorine-containing compound of the following formula $XCHF_2$ wherein X represents a fluorine atom, a chlorine atom, or a hydrocarbon group consisting only of carbon and hydrogen atoms. This patent does not teach the application initially of a fluorine-containing compound to a heated glass sheet prior to the application thereto of a doped tin oxide film.

DISCLOSURE OF INVENTION

The method of my invention is directed to a method for improving the conductivity and lowering the emissivity of a doped tin oxide film and, in particular, to a method of improving the conductivity and lowering the emissivity of a doped tin oxide film on the surface of a soda lime silica glass sheet.

In accordance with the teachings of my method of improving the conductivity and lowering the emissivity of a doped tin oxide film on the surface of a soda lime silica glass sheet, the following steps are carried out. The glass sheet is heated to a temperature in a range from 1000° F. to 1250° F.

A fluorine-containing compound is applied to the surface of the heated glass sheet. This fluorine-containing compound reacts with the surface of the glass sheet to form a film in which divalent oxygen atoms and hydroxyl ions are replaced with monovalent fluorine atoms. In such a manner, the surface of the glass sheet is brought closer to a state of electro-neutrality. Additionally, the monovalent fluorine atoms form a more stable bond with the soda and silica atoms of the surface of the glass sheet.

After the fluorine-containing compound has been applied to and reacted with the surface of the glass sheet, the last step of the method is carried out while the glass sheet is still in its heated condition. The last step of my method is that of applying to the heated glass sheet a doped tin oxide film to a thickness required to give the doped tin oxide film the desired conductivity and emissivity characteristics.

In accordance with teaching of preferred embodiments of the method of my invention, the fluorine-containing compound used to apply the first coat on the glass sheet is an agueous solution of ammonium fluoride. The preferred doped tin oxide film is applied by application of a solution of monobutyltin trichloride and ammonium fluoride in a water/methanol solvent.

BEST MODE AND INDUSTRIAL APPLICABILITY

The novel features that are considered characteristic of the invention are set forth with particularity in the appended claims. The invention itself, however, both as to its organization and its method of operation, together with additional objects and advantages thereof, will best be understood from the following description of specific embodiments.

The following description is what I consider to be a preferred embodiment of the method of improving the conductivity and lowering the emissivity of a doped tin oxide film on the surface of a soda lime silica glass sheet. The following description also sets forth what I now contemplate to be the best mode of carrying out the improved method of my invention. The description is not intended to be a limitation upon the broader principles of this method and while preferred materials are used in carrying out the method of my invention in accordance with the requirements of the laws, it does not mean that other materials cannot be used in carrying out the method of my invention.

In order to illustrate the method of my invention, the following information is set forth. The method of my invention is one of improving the conductivity and lowering the emissivity of a doped tin oxide film on the surface of a soda lime silica glass sheet. The conductivity and emissivity are directly related to one another as is well known to the skilled artisan. For the same thickness of film, if the conductivity thereof is improved, the emissivity thereof is also lowered. As has been previously stated, the lower the emissivity value of the coated glass sheet, the more radiation is rejected by the coating in the infrared area.

The method of my invention is carried out by heating a glass sheet to a temperature in a range from 1000° F. to 1250° F. The heating may be carried out by heating an individual glass sheet to the required temperature. As an alternative, however, a glass sheet manufactured by the float process exits from the float process with a temperature in the appropriate range. The method of my invention may be carried out by applying the chemical compositions to the glass surface directly after it is manufactured. In fact, this is the preferred arrangement because the surface of the glass sheet is in a just-formed stage and is very receptive to the application of chemical compositions thereto.

When the glass sheet has been heated to the appropriate temperature, a fluorine-containing compound is applied to the surface of the glass sheet. If the glass sheet has just been manufactured in a float glass operation, the sheet surface to which the chemicals are applied is the upper surface of the glass sheet. The fluorine-containing compound is one which reacts with the surface of the glass sheet to form a film in which dlvalent oxygen atoms and hydroxyl ions of the glass surface are replaced with monovalent fluorine atoms. When this occurs, the surface of the glass sheet is brought closer to a state of electro-neutrality. The monovalent fluorine atoms also form a more stable bond with soda and silica atoms of this surface of the glass sheet.

The principal solution that I use is an aqueous solution of ammonium fluoride. By aqueous solution, I mean that 5 to 10% by weight of ammonium fluoride is dissolved in an equally divided by weight solution of methanol and water. As an alternative, 20% by weight of ammonium can be dissolved in 80% by weight water. However, other fluorine-bearing compounds would similarly treat the glass surface. Compounds such as gaseous and liquid flurocarbons, and hydrofluoric acid, ammonium bifloride and trifluoroacetic acid in a suitable solvent can be used. I prefer ammonium fluoride because it is relatively inexpensive, dissolves in water, and reacts with the surface of the glass to form a film in which divalent oxygen atoms and hydroxyl ions of the glass surface are replaced with monovalent fluorine atoms from the ammonium flouride.

After the fluorine-containing compound is applied to the surface of the heated glass sheet, the still heated glass sheet has a film of doped tin oxide applied thereto. The doped tin oxide film is applied to a thickness required to give the doped tin oxide film the desired conductivity and emissivity characteristics. I prefer to use a solution of monobutyl tin trichloride (MBTC) and ammonium fluoride in a water/methanol solvent . The exact mixture of these materials are:

MBTC=53.8% by weight,
$NH_4F$=1.4%,
Water=1.4%, and
methanol 43.4%.

Other materials known to skilled artisans may be used to develop the doped tin oxide film. For example, materials such as stannous chloride, debutyl tin deacetate, tetra butyl tin and butyl tin hydroxide oxide may be used.

I have found that the emissivity value of a coated tin oxide is improved by the undercoating technique. For example, in four separate tests, with the same thickness of doped tin oxide film on the glass, the glass having the pretreatment of the fluorine-containing compound has the best emissivity value. The thickness of the fluorine-containing layer should be in a range from 10 nm to 85 nm, where the doped tin oxide film has a thickness in a range from 200 nm to 360 nm.

A first sample having the fluorine treatment at an emissivity value of 0.25 whereas the same thickness coating without the fluorine treatment had an emissivity value of 0.37. This is a substantial improvement in emissivity and would mean that the fluorine-treated material had more desirable characteristics in that the divalent oxygen atoms and hydroxyl ions on the surface of the glass sheet have been replaced with monovalent fluorine atoms. In another test, the fluorine treatment sample had an emissivity value of 0.29 where the untreated material had an emissivity value of 0.39.

Additional tests on coatings of different thickness showed an emissivity value of 0.31 with fluorine treatment and 0.39 without fluorine treatment. Another sample showed 0.26 for emissivity with fluorine treatment and 0.38 emissivity value without fluorine. Thus, each of the samples showed a definite improvement in the emissivity value with the fluorine treatment.

While particular embodiments of the method of my invention have been illustrated and described, it will be obvious to those skilled in the art that various changes and modifications may be made without departing from the invention and it is intended to cover in the appended claims all such modifications and equivalents as fall within the true spirit and scope of this invention.

I claim:

1. A method of improving the conductivity and lowering the emissivity of a doped tin oxide film on the surface of a soda lime silica glass sheet which comprises the steps of:

heating the glass sheet to a temperature in a range from 1000° F. to 1250° F.;

applying to a surface of said heated glass sheet ammonium fluoride which reacts with said surface to form a film in which divalent oxygen atoms and hydroxyl ions are replaced with monovalent fluorine atoms whereby said surface of the glass sheet is brought closer to a state of electro-neutrality and whereby said monovalent fluorine atoms form a more stable bond with soda and silica atoms of said surface of the glass sheet; and applying to said film formed on said heated glass sheet a doped tin oxide film to a thickness required to give said doped tin oxide film the desired conductivity and emissivity characteristics.

2. The method of improving the conductivity and lowering the emissivity of a doped tin oxide film on the surface of a soda lime silica glass sheet as set forth in claim 1 wherein said doped tin oxide film is formed from monobutyltin trichloride and ammonium fluoride.

* * * * *